Feb. 16, 1965  A. R. HUNTLEY ETAL  3,169,835
FLUIDIZED SOLIDS TECHNIQUE

Filed July 1, 1959  3 Sheets-Sheet 2

Allan R. Huntley
Steve T. Synodis   INVENTORS

BY *George J. Silhavy*

PATENT ATTORNEY

Feb. 16, 1965 A. R. HUNTLEY ETAL 3,169,835
FLUIDIZED SOLIDS TECHNIQUE
Filed July 1, 1959 3 Sheets-Sheet 3

Allan R. Huntley
Steve T. Synodis INVENTORS

BY George J. Silhan

PATENT ATTORNEY ated Feb. 16, 1965

3,169,835
FLUIDIZED SOLIDS TECHNIQUE
Allan R. Huntley, Cranford, and Steve T. Synodis, Roselle Park, N.J., assignors to Esso Research and Engineering Company, a corporation of Delaware
Filed July 1, 1959, Ser. No. 824,311
9 Claims. (Cl. 23—288)

This invention relates to improvements in processes wherein finely divided solids are contacted with fluids in the so-called fluidized solids technique. More particularly the present invention relates to improvements in contacting between gaseous fluids and finely divided solids in dense turbulent fluidized beds using low volume packing in a reaction vessel or zone.

The fluidized solids technique has been practiced commercially in the catalytic cracking of gas oils and the like to produce high octane gasoline. In such cracking units the catalyst particles are circulated between a reactor and a regenerator and in these vessels the catalyst particles are maintained as dense turbulent beds of fluidized solids having the appearance of a boiling liquid.

While fluidized solids beds have been used in large units such as catalytic cracking and have been proven commercially, an improvement in the contacting efficiency between the solids and gaseous fluids will result in large money savings. The contacting in some large cracking units between the solids and gaseous fluids has not been entirely satisfactory due to the formation of large gas or vapor bubbles passing up through the fluidized bed of solids which causes channeling and bypassing of gases or vapors without effective contact of portions of the upwardly flowing gases or vapors with the catalyst solids in the dense fluidized bed.

This problem has been noted in the prior art references and spaced perforated baffles have been proposed to be used within the dense fluidized bed to improve contacting between solids and gaseous fluid. Various forms of baffles have been proposed but have not proven successful for catalytic cracking units and have not been adopted for commercial use. Many types of baffles are shown in prior art patents but they are primarily intended for dividing a reactor vessel into smaller sections. Many prior art baffles are too heavy and clumsy and are difficult to introduce and arrange in a reactor vessel and also difficult to remove.

Packed towers are known but such towers or vessels containing packing such as Raschig rings or Berl saddles are entirely unsatisfactory for use with fluidized solids beds.

According to the present invention, improved contacting efficiency between solids and gaseous fluids is obtained by using low volume packing comprising closely spaced horizontal layers of flat coarse wire mesh (woven or welded) arranged in a treating or reactor vessel and separated and supported by open mesh spacer elements. Usually the spacers are made of the same material as the flat layers of coarse wire mesh and have extended prongs which engage the flat layers of coarse wire mesh to prevent the spacers and the flat layers from moving or rotating and disarrangement due to the vibrations of the fluidized bed.

The spacer elements may take various forms such as wire prisms of vertical triangular cross section, egg-crate spacers, made of peforated or unperforated sheet metal in various regular configurations, such as hexagonal, triangular or rectangular, or sinusoidally formed or corrugated sheets of coarse wire mesh or combinations thereof may be used.

In the preferred form the spacer elements are made from spacer flat strips cut from a flat sheet of coarse wire mesh in such a way that there are one or more full meshes across the strip, leaving the severed transverse wires protruding or projecting a short distance beyond the strip along either side. The flat strip is then bent into a shape to allow the spacer element to stand on edge alone. The flat strip can be bent into a number of configurations such as triangles, cylinders, boxes, helices etc. The cylindrical or circular spacer element is preferred as it is sturdy and easily manufactured.

The flat sheets of coarse wire mesh separated by the spacer elements form a stackable packing which is easily arranged in a reactor or treating vessel. The protruding or projecting ends of the wires extend through the adjacent top and bottom layers of horizontally arranged sheets of coarse wire mesh thus making the stack of packing more stable spatially as far as rotation is concerned. Of course, the spacer elements can be made from coarse wire mesh of a size different from that of the layers of coarse wire mesh.

A top and a bottom perforated grid of large open area are used to confine the packing in the treating vessel. One or more intermediate grids may be used when required by special circumstances but usually only a top and bottom grid are used. The grid used is one having a large open area, as for example, 75% or more open area.

In the drawings:

FIG. 9 represents a diagrammatic showing of one arrangement of egg crate spacers of the type shown in FIG. 8a.

Figure 1:
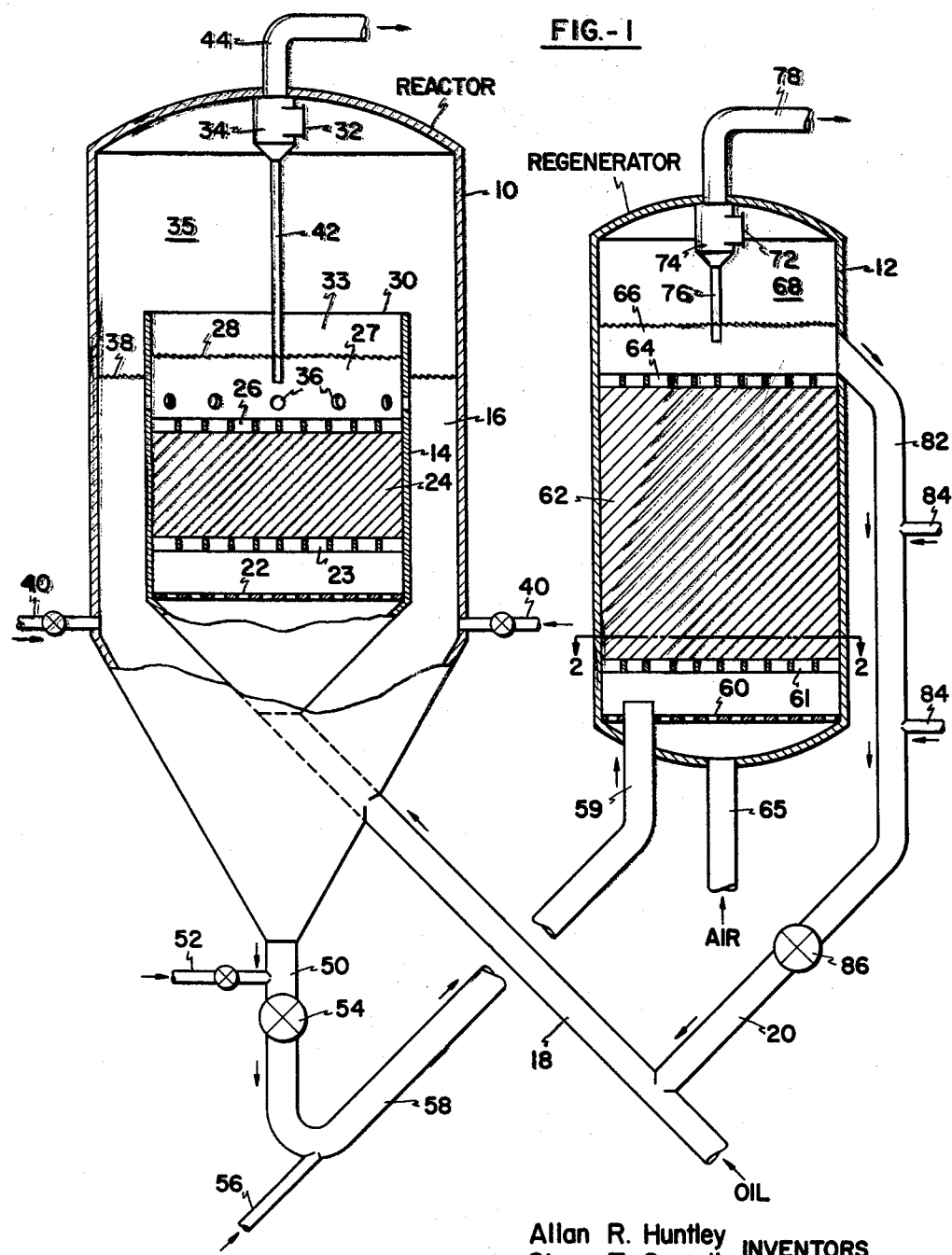
FIG. 1 represents one form of fluidized fluid solids unit which is adapted for use with the present invention.

Referring now to FIG. 1 of the drawings, the reference character 10 designates a vertically arranged cylindrical reactor vessel associated with a vertically arranged cylindrical regenerator vessel 12. The reactor vessel 10 has an internal smaller concentric cylinder 14 which forms the actual reactor and which is spaced from the wall of reactor vessel 10 to form an annular stripping section 16. The cylinder 14 and regenerator vessel 12 are shown as each having a packing which is shown diagrammatically in FIG. 1 but is shown in greater detail in other figures in the drawings.

Other forms of reactors can be used such as one omitting the internal cylinder 14 so that catalyst forms a dense turbulent bed in vessel 10 and is withdrawn through a stripping section.

In many of the catalytic cracking units, the contacting of the finely divided catalyst and hydrocarbon vapors is not as efficient as possible and hence the conversion of the hydrocarbons to lower boiling products suffers and in addition more carbon is produced than would be produced if better contacting were obtained. With better contacting between the catalyst particles and the gaseous fluid, a higher conversion of the hydrocarbons is obtained and less carbon is produced on the catalyst particles. With the present invention these desired results are obtained.

Oil to be cracked such as gas oil or other heavy hydrocarbon, preferably preheated to about 500° F.–700° F. is passed through line 18 where it is mixed with hot regenerated catalyst from standpipe 20. The regenerated catalyst particles are at a temperature between about 950° F. and 1200° F. and a sufficient amount of catalyst is used to vaporize the feed oil and raise it to a cracking temperature. The temperature in reactor cylinder 14 is between about 850° F. and 1000° F.

The cracking catalyst is any conventional catalyst such as synthetically prepared silica-alumina containing about 12% to about 40% of alumina by weight, acid treated bentonites, silica-magnesia, silica-alumina-magnesia, etc. The catalyst has a size range between about zero and 100 microns with most of the particles being between about 20 and 80 microns and with about 5% to 25% 0–40 micron material. The catalyst to oil ratio is between about 5 and 25. The oil vapors and catalyst mixture passes up through line 18 through bottom distribution grid 22 to distribute the oil vapors and catalyst particles across the area of the reactor cylinder 14. Usually steam is introduced into inlet line 18 to assist in vaporizing the oil feed and to provide additional fluidizing gas in reactor cylinder 14.

The superficial velocity of the fluidizing gasiform material passing up through the internal reactor cylinder 14 is between about 0.5 and 5 feet per second. The reactor cylinder 14 is provided with the low volume packing of the present invention and this is diagrammatically shown at 24 in FIG. 1. The grid 22 has an open area of about 2%. Arranged above grid 22 is another horizontally arranged grid 23 which has a much greater open area than grid 22 and which is used as a bottom supporting means for the packing 24. The grid 23 has an open or free area of about 75%–90% and is arranged about 2 to 3 feet above distribution grid 22. The grid 23 is substantially parallel to grid 22 and is constructed from beams or plates arranged in crossed relation such as in egg crate fashion. Other forms may be used. In reactors or treating vessels having a diameter between about 15 and 55 feet, the grid 23 may be made from beams or plates having a height of about 6 to 12 inches and a thickness of about ½ inch but other sized beams or plates may be used. The grid 23 is provided to facilitate inspection and repair of distribution grid 22.

A top confining grid 26 is preferably arranged on the top of the stacked packing 24 to confine the packing between the two grids 23 and 26. Top grid 26 serves a confining purpose only to prevent movement of the uppermost layers of packing. The top grid 26 is similar to bottom grid 23 and has an open or free area of about 75%–90%. Top grid 26 may have the same construction as bottom grid 23 or may have a different construction. The packing will be described in greater detail hereinafter.

The catalyst particles form a dense fluidized turbulent bed 27 in reactor cylinder 14 having a level indicated at 28 above the top grid 26 but below the upper open end 30 of the cylinder 14. The catalyst in the dense fluidized bed has a density for conventional silica alumina catalyst having 13% alumina between about 15 and 50 lbs. per cu. ft. The upper end 30 of cylinder 14 is about half way of the distance between bottom grid 22 and the inlet 32 to cyclone separating means 34 but this distance may be different for different units. Above the level 28 of the dense fluidized bed 27 is a dilute phase 33 comprising a dilute suspension of catalyst particles in gaseous fluid including vaporous reaction products. The dilute phase extends above the open end 30 of cylinder 14 into the region 35 which has a larger volume than that above the dense bed 27 in reactor 14 and so provides a reduction in gasiform material velocity which aids in the separation of entrained catalyst.

The upper portion of the cylinder 14 has a series of restricted orifices 36 through which fluidized catalyst particles flow from the fluidized bed 27 to the annular stripping space 16 arranged between the cylinder and the inner wall of the reactor vessel 10. The level of the fluidized solids in stripping section 16 is indicated at 38 and is at a lower level than the level 28 in the cylinder 14. Stripping gas such as steam is introduced through one or more lines 40 into the bottom portion of the stripping section for upward flow therethrough to strip volatile hydrocarbons from the spent catalyst particles.

During cracking coke or carbonaceous material is deposited on the catalyst particles and this reduces the activity of the catalyst. The catalyst is passed to regenerator 12 where the carbonaceous material is burned off to regenerate the catalyst and to supply heat to the catalyst which is recycled to the reactor 14.

The cracked vaporous products and steam and stripped-out materials pass upwardly through the dilute phase 33 in cylinder 14 and the dilute phase 35 above the catalyst level 38 in the stripping section and as they contain some suspended catalyst particles they are passed through inlet 32 of one or more cyclone separators or the like 34. The separated solids are returned to the dense bed 27 in cylinder 14 through dipleg 42 and the separated cracked vapors are taken overhead through line 44 and passed to suitable equipment to recover desired products.

The spent and stripped catalyst particles flow down from stripper 16 into standpipe 50 provided with one or more aerating or fluidizing lines 52 and control valve 54 to control the rate of discharge of the spent catalyst from the stripping zone or section 16. An oxygen-containing gas such as air is used to regenerate the catalyst and to burn carbonaceous material from the catalyst particles. In some regenerators the catalyst and air are passed up through a grid into the regenerator. In the form of apparatus shown in the drawing a small portion of air is passed through line 56 into the lower portion of standpipe 50 below control valve 54 to form a suspension of spent catalyst. The suspension of spent catalyst particles and air or the like is passed upwardly through line 58 having a vertical portion 59 extending into the bottom portion of regenerator 12 through and above bottom distribution grid 60 therein.

The grid 60 is horizontally arranged in the bottom portion of regenerator 12 and is structurally supported therein. The grid 60 has about the same diameter as the internal diameter of the regenerator 12 and has an open or free area of about 0.5%. Arranged about 2 to 3 feet above bottom distribution grid 60 and in spaced parallel relation thereto is a horizontally arranged packing support grid 61 for supporting the stacked packing diagrammatically shown at 62. Grid 61 has an open or free area of about 75% to 90% like grid 23 in reactor 14. The packing support and confining grids 23, 26, 61 and 64 may be made of a network of plate beams each having a depth of about 6 to 12 inches depending on strength requirements. The openings may be either rectangular in the grating or merely a suitable spacing between plate beams. The top grid 64 has an open or free area of about 75% to 90%.

The rest of the regenerating gas such as air passes up through line 65 into the space in the bottom of the regenerator 12 below distribution grid 60. The oxygen-containing gas or air passes up through regenerator 12 at a superficial velocity between about 0.5 and 5 feet per second to produce a dense fluidized turbulent bed having a top level 66 and a dilute phase 68 thereabove. The fluidized bed of catalyst in the regenerator 12 has a density between about 15 and 50 lbs. per cu. ft. for the silica-alumina catalyst above mentioned.

The regeneration gases contain entrained solids and are passed through inlet 72 of cyclone separating means 74 to separate solids from the gases. The separated catalyst solids are returned to the dense fluidized bed 66 in the regenerator through dipleg 76 and the separated hot gases pass overhead through line 78. The hot gases may be passed through a waste heat boiler, a waste gas turbine, or the like to recover energy therefrom. The temperature during regeneration in the regenerator 12 is between about 900° F. and 1200° F.

Hot regenerated catalyst particles are withdrawn from the upper portion of the dense fluidized bed 66 in the regenerator 12 and from above top grid 64 and passed down through standpipe 82 provided with one or more aerating or fluidizing lines 84 to maintain the solid catalyst particles in flowable and fluidized condition. The lower portion of standpipe has a control valve 86 to control the rate of flow or discharge of catalyst from standpipe 82 into oil feed line 18 leading to the reactor cylinder 14.

If a reactor is desired omitting inner cylinder 14, the grid 22 would extend across the entire cross section of vessel 10 such as shown in the regenerator 12 and catalyst and oil would be passed through grid 22 into the reactor vessel 10. Spent catalyst would be taken off the reactor vessel 10 through an overflow pipe similar to that shown at 82 in connection with the regenerator 12. The overflow pipe could be enlarged and be provided at least on its upper portion with the same kind of stacked packing shown diagrammatically in FIG. 1 and forming part of the present invention to provide a stripping section into the bottom of which a stripping gas such as steam would be introduced. The reactor vessel 10 would contain the stacked low volume packing arranged as shown in cylinder 14.

Figure 2:
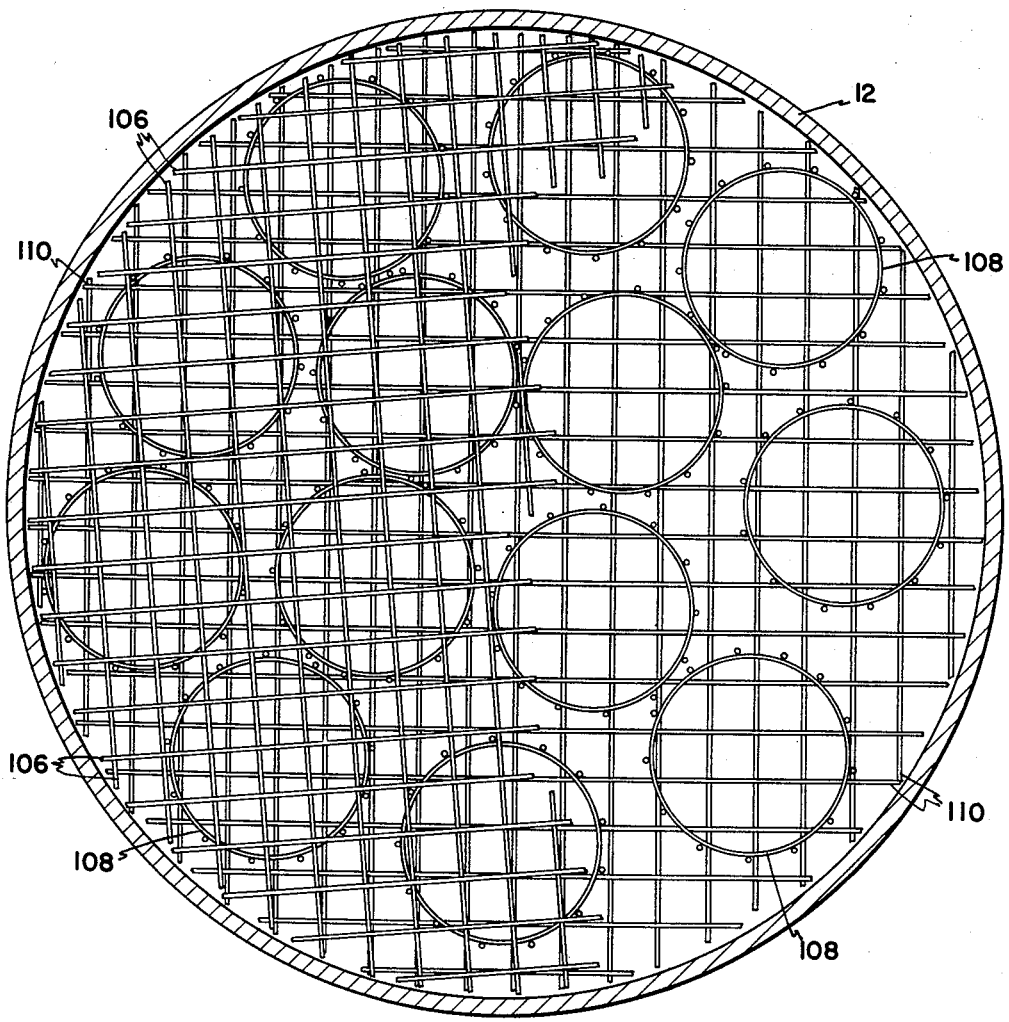
FIG. 2 represents an enlarged horizontal section taken along line 2—2 of FIG. 1 with parts broken away and with the bottom grids omitted to facilitate the disclosure.

The stacked packing will now be specifically described. As shown in FIG. 2, each of the flat horizontally arranged layers of coarse wire mesh is cut to the size of the internal diameter of regenerator vessel 12. This is also true of cylinder 14. With large vessels the wire mesh layer at one level may be made of a number of sections cut from coarse wire mesh to fit inside the vessel and to facilitate installation in a vessel. The wire mesh is woven or welded, but preferably welded to make 1 inch to 6 inch squares or rectangles with unequal sides, that is, the sides may be of equal length or two parallel sides may be one dimension, as 2 inches, and the other two parallel sides may be 4 inches, for example. The wire mesh is similar to the reinforcing mesh used for concrete work.

Figure 4:
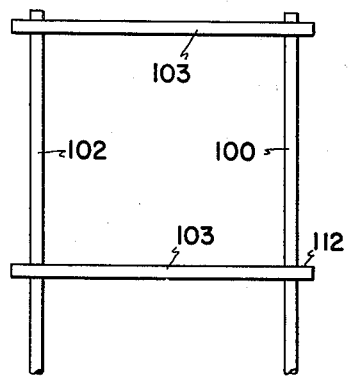
FIGS. 4, 5 and 6 represent different stages in the manufacture of the spacer element shown in FIG. 5.
Figure 5:
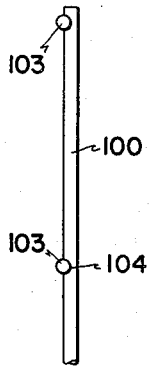

The wire making up the wire mesh is heavy gauge wire having a diameter between about 0.1 and 0.25 of an inch and as shown in FIGS. 4 and 5, where only a portion of a flat layer of coarse wire mesh is shown, the two long parallel wires 100 and 102 are in the same plane and the shorter parallel cross wires 103 rest on wires 100 and 102 and are arranged in a different plane parallel to the plane of wires 100 and 102. Wires 103 are preferably at right angles to wires 100 and 102. While making the wire mesh, pressure is applied to the wires 100 and 102 and short cross wires 103 arranged as shown and the wires are then spot welded where the wires are in contact. The heat and pressure causes the wires to be mutually indented or partially imbedded as shown at 104 in FIG. 5.

Referring again to FIG. 2, the top layer 106 of wire mesh is shown as having square openings. These openings may take other forms, as for example, rectangles with unequal sides, that is, the rectangle may be 2 inches by 4 inches or 4 inches by 6 inches, etc. Other configurations of the wire mesh may be used but the square or rectangular shapes are cheapest and most practical. The flat sheets of wire mesh should have an open area between about 80 and 95% of the horizontal cross section of the vessel. The open area in a horizontal plane taken through the vertical cylindrical spacers across the diameter of the vessel is between about 99 and 99.9%. So on an average the open mesh packing of the present invention takes up about 0.5 to 1.5% by volume of the reactor or treating volume. The stacked packing forms a non-cellular, low volume, open mesh packing.

FIG. 2 shows only a portion of the top layer 106 of wire mesh and indicates that the top layer 106 is cut to fit into the circular contour of vessel 12. The layer 106 rests on circular spacers 108 which in the preferred form are made of strips cut from wire mesh similar to that used for the horizontal layers like layer 106. Top layer of wire mesh 106 is broken away in FIG. 2 to show the next lower wire mesh layer 110 upon which spacers 108 rest.

In arranging the parallel layers of wire mesh in the treating vessel it is preferred to have each successive layer of wire mesh rotated in the same direction through a small angle with respect to its adjacent layers so that if the wires forming the wire mesh of one layer were projected to the plane of the adjacent layer above or below the projections would form a small angle with the corresponding wires in the adjacent layer above or below and this angle may be between about 1° and 45°, preferably between about 5° and 15°. This produces a non-cellular packing. In this way the wires in top layer 106, for example, would be arranged at an angle to the next lower layer 110 as shown in FIG. 2 so that the holes or openings in the layers of wire mesh do not line up through the treating vessel. This is also shown in FIG. 12. This disaligned arrangement further prevents bubbles of gas or vapor from passing up through the stacked packing undisturbed. The present invention provides a multiplicity of obstructions or wires or interferences to provide an open mesh easily stacked spatially stable packing for breaking up large bubbles and to prevent small bubbles from growing large as they pass up through the fluidized bed of solids.

Figure 3:
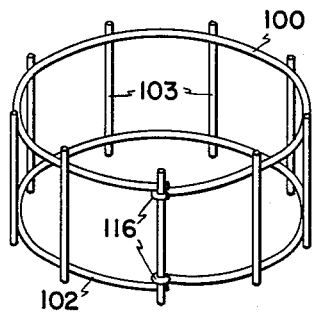
FIG. 3 represents a perspective view of one form of spacer element.
Figure 6:
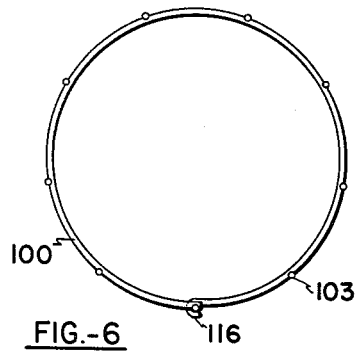

In FIG. 3 is shown a perspective view of a preferred form of spacer and FIGS. 4, 5 and 6 show one way of making the circular spacers. As shown in FIG. 4 a strip is cut from a wire mesh flat sheet to have the cross wires 103 extend a short distance beyond the parallel long wires 100 and 102 as at 112. The several transverse wires protrude a short distance along either side. The one end of the strip has the ends of the parallel wires 100 and 102 substantially flush with or ending near the end cross wire 103, while the other end of the strip has the ends of the parallel wires 100 and 102 free and extending beyond the cross wire 103 at the other end of the strip as at 114. The free ends of long parallel wires 100 and 102 are bent over to form hooks or U-shaped catches 116 which act to engage end cross wire 103 at the opposite end of the strip when the strip is bent into circular form as shown in FIGS. 3 and 6. The hook ends at 116 are bent together slightly as shown at 117 to engage the short wire 103 between wires 100 and 102 as shown in FIG. 3. As shown in FIGS. 2 and 3 the spacers 108 are stood on edge. The cut strips may be formed in any way to allow them to stand alone on edge. Many configurations are possible such as triangles, cylinders, boxes, helices etc.

Figure 7:
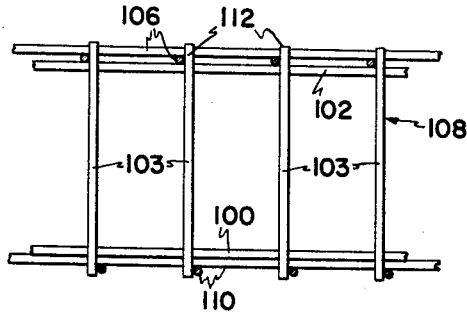
FIG. 7 represents a detail showing how the wire ends protrude into the flat horizontal layers of coarse mesh screens and hold them spatially stable.

The end portions 112 which extend beyond the circular spacers act to engage portions of the wires forming the horizontal layers of wire mesh such as 106, 110 etc. and prevent dislocation of the layers of wire mesh. These end portions 112 protrude through the adjacent layers of horizontal mesh above and below a distance at least equal to the thickness of one wire of the mesh of the layer, thus making the stack of packing more stable spatially as far as horizontal shifting and/or migration of the packing elements are concerned. As diagrammatically shown in FIG. 7, and using the same reference characters as in FIGS. 2 and 4, the ends 112 of the short cross wires 103 of spacer 108 engage certain wires in top layer 106 and lower layer 110.

The wire mesh is made of 3 inch squares so that the flat horizontal layers of wire mesh are held about 3 inches apart. The circular spacers 108 are about 12 inches in diameter. The projecting ends 112 extend about one-half of an inch beyond each of the parallel wires 100 and 102. In one specific form there are 13 short wires 103 in each spacer 108. However, the size of the spacers may be varied as desired and may be smaller or larger, from 2 to 12 inches in height and 8 inches to 2 feet in diameter.

In one specific form the layers of flat horizontal wire mesh and spacers are arranged in a 5 foot diameter vessel in a stack which is about 20 feet deep. In this particular form there are 13 spacers between each flat layer of wire mesh and there are about 80 layers of wire mesh. In arranging the packing in a vessel, the bottom layer is preferably a wire mesh layer.

The stack of packing fills substantially the entire volume of the vessel and is confined between the two horizontal grids arranged at the top and bottom of the vessel as above pointed out. These grids have an open area of about 90%. Intermediate supporting grids of similar open or free area may be used in certain special cases, if desired, or if necessary. The grids 22, 23, 60 and 61 are suitably supported in their respective vessels.

The spacers and the mesh packing or layers of wire mesh are oriented and arranged so that any vertical path through the unit or vessel will meet as many interceptions or wires as possible to prevent the formation of large bubbles as the gas passes upwardly through the unit or vessel. The spacers may be made in various ways and formed into different shapes. The spacers may be formed in triangular cross section or other shapes. Combinations of the foregoing types can be used in a given unit, if desired. The size of the mesh of the layers of coarse wire mesh and of the dimensions of the spacers may be varied in a given unit, if required, to accommodate variations in gas velocity from the bottom to the top of the unit.

The design strength of all the foregoing types of spacers can be varied, if desired, from the bottom of the unit to the top thereof to minimize the total weight of the stacked packing of layers of wire mesh, due to the need for less strength at the higher levels. During turnarounds, the stacked packing would be fairly simple to remove intact. The wire size and other dimensions of the spacer mesh may be varied in a given installation to accommodate variations in gas velocity from the bottom to the top of the unit, or to give adequate strength without necessary weight.

If desired or if necessary the stacked packing may be tack welded during installation to rigidify the structure.

Where diplegs 42 and 76 extend down into the packing shown diagrammatically in reactor 10 and regenerator 12, the trickle valves on the lower ends of such diplegs are preferably arranged within the circular spacers 108 so that minor movement of the packing does not interfere with the proper functioning of the trickle valves.

Figures 8, 8A:
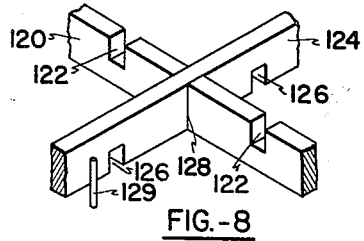
FIG. 8 and 8a represent different forms of egg crate spacers in perspective.
Figure 9:
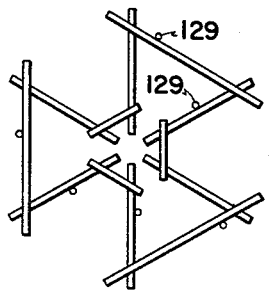

In FIGS. 8, 8a and 9 are shown portions of spacers of egg crate shape. In FIG. 8 the vertical plates or strips are provided with complementary notches for assembly. One plate 120 has square notches 122 at right angles to the plate in its upper surface and the other plate 124 has square notches 126 in its lower surface so that the two plates can be assembled as shown to have the plates 120 and 124 at right angles to each other. The junction at 128 can be tack welded, if desired. The plates 120 and 124 can be perforated to reduce the weight thereof, if desired.

One or both of the plates 120 and 124 are preferably provided with randomly located pins 129 which extend down from plate 124 in FIGS. 8 and 9 to below the lower edge thereof to prevent spacer rotation and/or migration thereof when the unit is in use.

In FIG. 8a there is shown a modification of the plates shown in FIG. 8 in that the slots 130 in the plate 132 are shown at an angle other than a right angle to the plate 132 to provide for the particular interfitting arrangement of spacers shown in FIG. 9.

Figure 10:
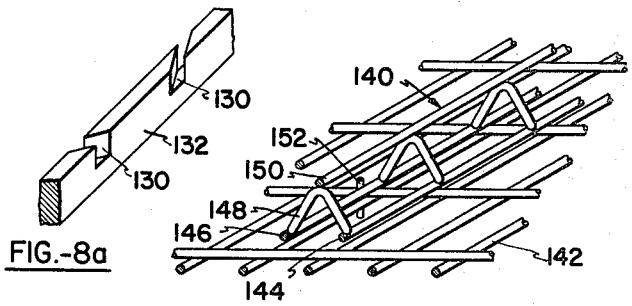
FIG. 10 represents another form of spacer element in perspective made up of a different arrangement of wires.

FIG. 10 represents a different form of spacer 140 resting on a horizontal layer of a coarse wire mesh 142. The spacer is formed of two parallel bottom wires 144 and 146 which are connected by spaced inverted V-shaped members 148. One end of each V-shaped member 148 is attached to one parallel wire 144 and the other end of each V-shaped member 148 is attached to the other parallel wire 146 in any suitable manner as by welding. Each V-shaped member is in a plane at right angles to wires 144 and 146. The tops of the V-shaped members are connected by a single wire 150 in any suitable manner as by welding. Randomly located pins are secured to one of the parallel wires 144 and 146 as shown at 152 to prevent rotation of the spacer 140. The pin 152 extends below the plane of wires 144 and 146 to engages a wire in the layer 142 of wire mesh below the spacer 140.

A five foot diameter unit having a fluid bed height of 20 feet was used to study contacting efficiency of gases and finely divided catalyst solids. One catalyst mixture contained 7% by weight of 0–40 micron size material, about 78% by weight of 40 to 80 micron size and 15% by weight of 80+ size. Another catalyst, termed a coarse catalyst, contained about 2% by weight of 0–40 micron size material, about 60% by weight of 40 to 80 micron size and about 38% by weight of 80+ size. Gas superficial velocities between about 1 and 4 feet per second were used and the gas used was air at 15 p.s.i.g. Using helium tracer methods, and solids mixing tests, the contacting efficiency of a unit with no packing was determined and compared with the contacting efficiency that was determined for the same unit with packing using the same type catalysts in both. The packed vessel was like that shown in the drawings using 3 inch wire mesh layers separated by 3 inch spacers. The data at 2.2 ft./sec. are summarized in the following table.

*Table*

| Wt. percent 0-40 micron | Packing | Relative Contacting Efficiency |
|---|---|---|
| 2 | None | 40 |
| 2 | Packing | 66 |
| 7 | None | 63 |
| 7 | Packing | 73 |

The data show that the open mesh wire packing stacked as shown in FIG. 2 produces a substantial improvement in contacting efficiency with catalyst mixtures deficient in 0–40 micron size materials as well as cracking catalyst mixtures containing sufficient 0–40 micron size material to obtain fairly good fluidization.

The invention is primarily intended for improving contacting in catalyst cracking units but the invention is not to be restricted thereto as the invention is applicable in other similar processes where improved contacting in a dense fluidized bed of finely divided solids is desired. The catalytic cracking operation and regeneration of the cracking catalyst is carried out at substantially atmospheric pressure.

As pointed out above improved contacting between vapors and solids is obtained in a catalytic cracking reactor. With a regeneration zone provided with stacked packing according to the present invention, improved contacting between the spent catalyst particles and air in the regeneration zone is obtained. The improved contacting between solids and gas in the regeneration zone packed with wire mesh packing of the present invention results in better air utilization in the regeneration zone which increases the $CO/CO_2$ ratio therein and increases the carbon-burning capacity. In this way better and more efficient regeneration of the spent catalyst particles is obtained during regeneration and there is less carbon on the regenerated catalyst than in the conventional regeneration zones.

If desired, the carbon on the regenerated catalyst may be maintained at the same level as with conventional regeneration, while retaining the advantages of better air utilization and higher carbon-burning capacity due to the improved contacting efficiency resulting from the packing. Advantage can be taken of the improved air utilization by either increasing the carbon-burning rate at the same air rate, or by reducing the air rate at constant carbon-burning rate.

To improve stripping in the stripping zone 16 and to improve contacting of the spent catalyst particles with steam or other stripping gas, the annular stripping section 16 can be provided with stackable packing of the type above described according to the present invention. To get good removal of entrained and adsorbed hydrocarbons from the catalyst particles leaving the reaction zone 14 in the fluid catalytic cracking reactor 10, there must be intimate contacting of the catalyst particles with the purging or stripping gas. Steam blasting through the fluidized catalyst in the stripping zone without adequate contacting is largely wasted. Catalyst particles not properly purged or stripped carry with them valuable hydrocarbons and this also puts an extra burden on the regeneration zone as these hydrocarbons are burned in the regeneration zone.

To prevent both types of deleterious by-passing, the present invention provides a low volume stackable wire packing in the stripping section 16 which is shown as annular in FIG. 1 but which may take any other suitable shape or form. This type of packing breaks up pockets or large bubbles of upflowing and by-passing purge gas and also breaks up agglomerates of down-flowing catalyst particles and in this way improved stripping is obtained with improved hydrocarbon recovery and lower stripper steam requirements. The packing is not shown in stripping section 16 in FIG. 1 but would be arranged in layers as shown in FIG. 2 of the drawings using any shaped separator desired.

The present invention is not limited to catalytic cracking but is useful in improving contact between gaseous material and finely divided solids in other reactions such as fluid hydroforming, isomerization, coking, polymerization, hydrofining, alkylation, partial oxidation, chlorination, dehydrogenation, desulfurization etc.

The invention is not to be limited to the specific embodiments above described as various and numerous variations and modifications may be made without departing from the spirit of the invention.

What is claimed is:

1. An apparatus adapted for use in improving contacting between finely divided solids and gaseous fluid in a dense fluidized condition and adapted to break up large gaseous bubbles and to prevent bubble growth which includes a vertically arranged cylindrical vessel having a bottom inlet and outlet means, means for introducing finely divided solids and gaseous material into said bottom inlet for passage through said vessel, means for withdrawing finely divided solids and gaseous material after they have passed through said vessel, said vessel being provided with a mesh packing comprising a multiplicity of spaced horizontal layers of flat coarse wire mesh having rectangular openings of from 1 to 6 inches formed from coarse wire mesh and held in vertically spaced and stacked relation by a multiplicity of coarse wire mesh spacer means, said mesh packing comprising said coarse wire mesh layers and spacer means substantially completely filling said vessel and having an open area within said vessel of between 80% and 95% and said mesh packing and spacer means being stacked one above the other without being fixedly attached to said vessel or to each other, said spacer means including separate units each being formed from a narrow strip of flat coarse wire having protruding wire ends and having rectangular openings of from 1 to 6 inches and being formed by bending said strip and connecting the ends to form a substantially circular spacer means unit and arranged on its edge so that said protruding wire ends engage the wire mesh in adjacent layers of said flat coarse wire mesh to maintain said packing spatially stable.

2. An apparatus according to claim 1 wherein each horizontal layer of coarse wire mesh is separated by a plurality of said individual spacer means units.

3. An apparatus according to claim 1 wherein the open area of a horizontal cross section taken through said vessel at any region of the stacked packing is at least about 80%.

4. An apparatus according to claim 3 wherein the stacked packing takes up less than about 1.5% by volume of said vessel.

5. An apparatus according to claim 1 wherein each of said spacer means units has the ends of the elongated wires bent to form hooks which engage the other end of said strip to form a substantially circular spacer means unit when said strip is bent into substantially circular form.

6. An apparatus adapted for use in improving contacting between finely divided solids and gaseous fluid in a dense fluidized condition and adapted to break up large gaseous bubbles and to prevent bubble growth which includes a vertically arranged cylindrical vessel having a bottom inlet and outlet means, means for introducing finely divided solids and gaseous material into said bottom inlet for passage through said vessel, means for withdrawing finely divided solids and gaseous material after they have passed through said vessel, said vessel being provided with a mesh packing comprising a multiplicity of spaced horizontal layers of flat coarse wire mesh having rectangular openings of from 1 to 6 inches formed by welding coarse wire mesh and held in vertically spaced and stacked relation by a multiplicity of spacer means units, said mesh packing comprising said coarse wire mesh layers and spacer means units substantially completely filling said vessel and having an open area within said vessel of between 80% and 95% and said mesh packing and spacer means units being stacked one above the other without being fixedly attached to said vessel or to each other, said spacer means units including notched interfitting plates arranged on edge and at least one plate having a pin projecting beyond the vertical limits of the plate to function as an anchor for said notched plates.

7. An apparatus adapted for use in improving contacting between finely divided solids and gaseous fluid in a dense fluidized condition and adapted to break up large gaseous bubbles and to prevent bubble growth which includes a vertically arranged cylindrical vessel having a bottom inlet and outlet means, means for introducing finely divided solids and gaseous material into said bottom inlet for passage through said vessel, means for withdrawing finely divided solids and gaseous material after they have passed through said vessel, said vessel being provided with a mesh packing comprising a multiplicity of spaced horizontal layers of flat coarse wire mesh having rectangular openings of from 1 to 6 inches formed by welding coarse wire mesh and held in vertically spaced and stacked relation by a multiplicity of coarse wire mesh spacer means, said mesh packing comprising said coarse wire mesh layers and spacer means substantially completely filling said vessel and having an open area within said vessel of between 80% and 95% and said mesh packing and spacer means being stacked one above the other without being fixedly attached to said vessel or to each other, said spacer means units including notched interfitting plates arranged on edge and at least one plate having a pin projecting beyond the vertical limits of the plate to function as an anchor for said notched plates, said spacer means units include parallel wires in one plane connected to a third parallel wire in a different plane, said wires being connected together by inverted V-shaped members, the open ends of said V-shaped members being secured to said first two parallel wires and the closed end of the V-shaped members being secured to said third wire.

8. An apparatus according to claim 7 wherein at least one of the first two parallel wires is provided with a pin projecting below the plane of said first two wires.

9. Apparatus including a vessel, a bottom open mesh grid supported in said vessel and forming means for supporting a stacked, spatially stable, non-cellular, low volume, open mesh packing means, which takes up less than about 1.5% by volume of said vessel, said packing means including a multiplicity of layers of coarse wire mesh of substantially the same size as the interior of said vessel and horizontally arranged in spaced relation in said vessel and low volume open mesh spacing means made of coarse wire mesh arranged between said horizontal layers of coarse wire mesh to maintain said horizontal layers in spaced relation whereby the open mesh packing means is supported on said bottom open mesh grid by stacking without physical attachment to the inner wall of said vessel.

References Cited in the file of this patent

UNITED STATES PATENTS

| | | |
|---|---|---|
| 1,262,317 | Finney et al. | Apr. 9, 1918 |
| 2,327,184 | Goodloe | Aug. 17, 1943 |
| 2,424,612 | Gunter | July 29, 1947 |
| 2,463,729 | Watson | Mar. 8, 1949 |
| 2,537,685 | Matheson | Jan. 9, 1951 |
| 2,581,134 | Odell | Jan. 1, 1952 |
| 2,718,491 | Green | Sept. 20, 1955 |
| 2,893,849 | Krebs | July 7, 1959 |
| 2,893,851 | Georgian | July 7, 1959 |
| 2,894,050 | Stiles | July 7, 1959 |
| 2,931,711 | Walker | Apr. 5, 1960 |
| 3,048,276 | Darnell | Aug. 7, 1962 |